US010283149B2

(12) United States Patent
Lamberts et al.

(10) Patent No.: US 10,283,149 B2
(45) Date of Patent: May 7, 2019

(54) ENERGY-ASSISTED MAGNETIC RECORDING DEVICE CAPABLE OF PREDICTING THE USABLE LIFE OF MAGNETIC HEAD

(71) Applicant: Western Digital Technologies, Inc., San Jose, CA (US)

(72) Inventors: Bernd Lamberts, San Jose, CA (US); Classica Jain, Freemont, CA (US); Remmelt Pit, Menlo Park, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/953,353

(22) Filed: Apr. 13, 2018

(65) Prior Publication Data
US 2018/0301163 A1    Oct. 18, 2018

Related U.S. Application Data

(60) Provisional application No. 62/485,732, filed on Apr. 14, 2017, provisional application No. 62/514,764, filed on Jun. 2, 2017.

(51) Int. Cl.
*G11B 5/455* (2006.01)
*G11B 5/60* (2006.01)
(Continued)

(52) U.S. Cl.
CPC ............. *G11B 5/455* (2013.01); *G11B 5/607* (2013.01); *G11B 5/6088* (2013.01); *G11B 7/127* (2013.01);
(Continued)

(58) Field of Classification Search
CPC ....... G11B 5/455; G11B 5/607; G11B 5/4555; G11B 5/6076; G11B 2005/0021;
(Continued)

(56) References Cited

U.S. PATENT DOCUMENTS 5,412,518 A    5/1995  Christner et al.
5,978,163 A    11/1999 Cunningham
(Continued)

OTHER PUBLICATIONS

Aneesh Kumar et al.; "Ext4 block and inode allocator improvements"; Proceedings of the Linux Symposium, (2008).
(Continued)

*Primary Examiner* — Tan X Dinh
(74) *Attorney, Agent, or Firm* — Barry IP Law, P.C.

(57) ABSTRACT

A Data Storage Device (DSD) includes a magnetic storage medium and a head configured to read and write data using a current default write policy that affects an amount of power output by at least one write-assistive component of the head. One or more experimental writes are performed by writing data on the magnetic storage medium using an experimental write policy for the at least one write-assistive component, and the data is read from the magnetic storage medium. An experimental performance of the one or more experimental writes is evaluated based on the reading of the data. An experimental prediction value is determined indicating a predicted usable life of the head based on the evaluation of the experimental performance. Based on the experimental prediction value, it is determined whether to change the current default write policy for the at least one write-assistive component for future non-experimental writes.

27 Claims, 6 Drawing Sheets

(51) Int. Cl.
*G11B 5/00* (2006.01)
*G11B 7/127* (2012.01)

(52) U.S. Cl.
CPC ............ *G11B 2005/0021* (2013.01); *G11B 2005/0024* (2013.01)

(58) Field of Classification Search
CPC ............ G11B 2005/0024; G11B 7/126; G11B 7/1263; G11B 7/1267; G11B 5/6088
See application file for complete search history.

(56) References Cited

U.S. PATENT DOCUMENTS

| | | | |
|---|---|---|---|
| 6,249,890 B1* | 6/2001 | Ukani | G06F 11/008 360/53 |
| 7,149,657 B2 | 12/2006 | Goebel et al. | |
| 8,122,185 B2 | 2/2012 | Merry et al. | |
| 9,013,920 B2 | 4/2015 | Stoev et al. | |
| 9,053,747 B1* | 6/2015 | Zhang | G11B 20/182 |
| 9,208,808 B1* | 12/2015 | Ding | G11B 5/5547 |
| 9,218,849 B1* | 12/2015 | Trantham | G11B 27/36 |
| 9,690,696 B1 | 6/2017 | Hefner et al. | |
| 9,916,847 B1* | 3/2018 | Granz | G11B 5/455 |
| 2007/0180328 A1 | 8/2007 | Cornwell et al. | |
| 2007/0266200 A1 | 11/2007 | Gorobets et al. | |
| 2012/0246403 A1 | 9/2012 | McHale et al. | |
| 2016/0055881 A1* | 2/2016 | Cordle | G11B 20/10388 369/13.27 |
| 2016/0104514 A1* | 4/2016 | Burnett | G11B 5/6088 369/13.02 |
| 2018/0005657 A1* | 1/2018 | Daugela | G11B 5/607 |

OTHER PUBLICATIONS

Bair V. Budaev, and David B. Bogy; "On the lifetime of plasmonic transducers in heat assisted magnetic recording"; Journal of Applied Physics, 112.3 (2012): 034512.
Cisco; "Cisco global Cloud Index 2015-2020"; 2016; available at http://www.cisco.com/c/dam/en/us/solutions/collateral/service-provider/global-cloud-index-gci/white-paper-c11-738085.pdf.
Ivo Grondman, Lucian Busoniu, Gabriel Lopes, and Robert Babuska; "A survey of actor-critic reinforcement learning: standard and natural policy gradients"; IEEE Transactions on Systems, Man, and Cybernetics, Part C: Applications and Reviews, IEEE, 2012, 42(6), pp. 1291-1307.
Ming-Chang Yang, et al. "Garbage collection and wear leveling for flash memory: Past and future." Smart Computing (SMARTCOMP), 2014 International Conference on. IEEE, 2014.
Richard S. Sutton, and Andrew G. Barto; Reinforcement Learning: An Introduction; MIT Press; 1998; ISBN 0-262-19398-1.
Scott Sanner and Marcus Hutter, eds. Recent Advances in Reinforcement Learning: 9th European Workshop, EWRL 2011, Athens, Greece, Sep. 9-11, 2011, Revised and Selected Papers. vol. 7188. Springer, 2012.
Tim Feldman and Garth Gibson. Shingled magnetic recording areal density increase requires new data management.: USENIX; login: Magazine 38.3 (2013).

* cited by examiner

ENERGY-ASSISTED MAGNETIC RECORDING DEVICE CAPABLE OF PREDICTING THE USABLE LIFE OF MAGNETIC HEAD

CROSS-REFERENCE TO RELATED APPLICATIONS

This application claims the benefit of U.S. Provisional Application No. 62/485,732, filed on Apr. 14, 2017, which is hereby incorporated by reference in its entirety. This application also claims the benefit of U.S. Provisional Application No. 62/514,764, filed on Jun. 2, 2017, which is hereby incorporated by reference in its entirety.

BACKGROUND

Data Storage Devices (DSDs) are often used to record data onto or to reproduce data from a storage medium. One type of storage medium includes a rotating magnetic disk, such as in a Hard Disk Drive (HDD) or a Solid-State Hybrid Drive (SSHD). In such DSDs, a head is positioned in relation to a disk to magnetically read and write data in tracks on a surface of the disk. The head is typically located on a distal end of an actuator moved by a Voice Coil Motor (VCM).

The amount of data that can be stored on a disk in a given area (i.e., an areal density) generally continues to increase with each new generation of DSDs that use a disk to store data. New technologies have been introduced or are in development to allow DSD heads to write more data in a given area using various energy-assisted recording techniques. Such energy-assisted recording techniques can include Thermal Fly-Height Control (TFC), Heat Assisted Magnetic Recording (HAMR), and Microwave Assisted Magnetic Recording (MAMR).

TFC uses a heater on the head to adjust a fly-height of the head over the disk to allow the head to get closer to the disk when writing data to increase the storage density. HAMR uses a laser diode on the head to heat a small region of the disk that is to be written by the head. The heating of the disk temporarily lowers the coercivity of grains in the disk to allow the grains to become magnetized by the head, before returning to a higher coercivity after cooling off. This allows the use of smaller grains (and thus a higher storage density) that require a higher coercivity to remain magnetized after being written due their smaller size. MAMR uses a Spin Torque Oscillator (STO) on the head to generate a microwave field that allows the disk to be more easily magnetized with a lower magnetic field so that a higher storage density can be achieved.

However, the use of energy-assisted recording techniques can decrease the usable life of the head. In some cases, the decreased life of the head can be due to the degrading or deterioration of components in the head caused by heating. In other cases, the decreased life of the head can be due to a smaller distance or fly-height between the disk and the head, causing increased friction or wear on the head. A lowered fly-height can also increase the accumulation of disk lubricant or other particles on the head due to forces from air pressure, electrostatic forces, and/or intermolecular forces. Such accumulation of lubricant or particles on the head can interfere with the reliable reading or writing of data by the head. Accordingly, the usable life of heads in new DSDs will be shortened due to the emerging use of energy-assisted recording techniques and the continued need to reduce the head-disk interface spacing. In addition, the increased amount of data stored on disks will increase the amount of data that needs to be written or read by each head.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
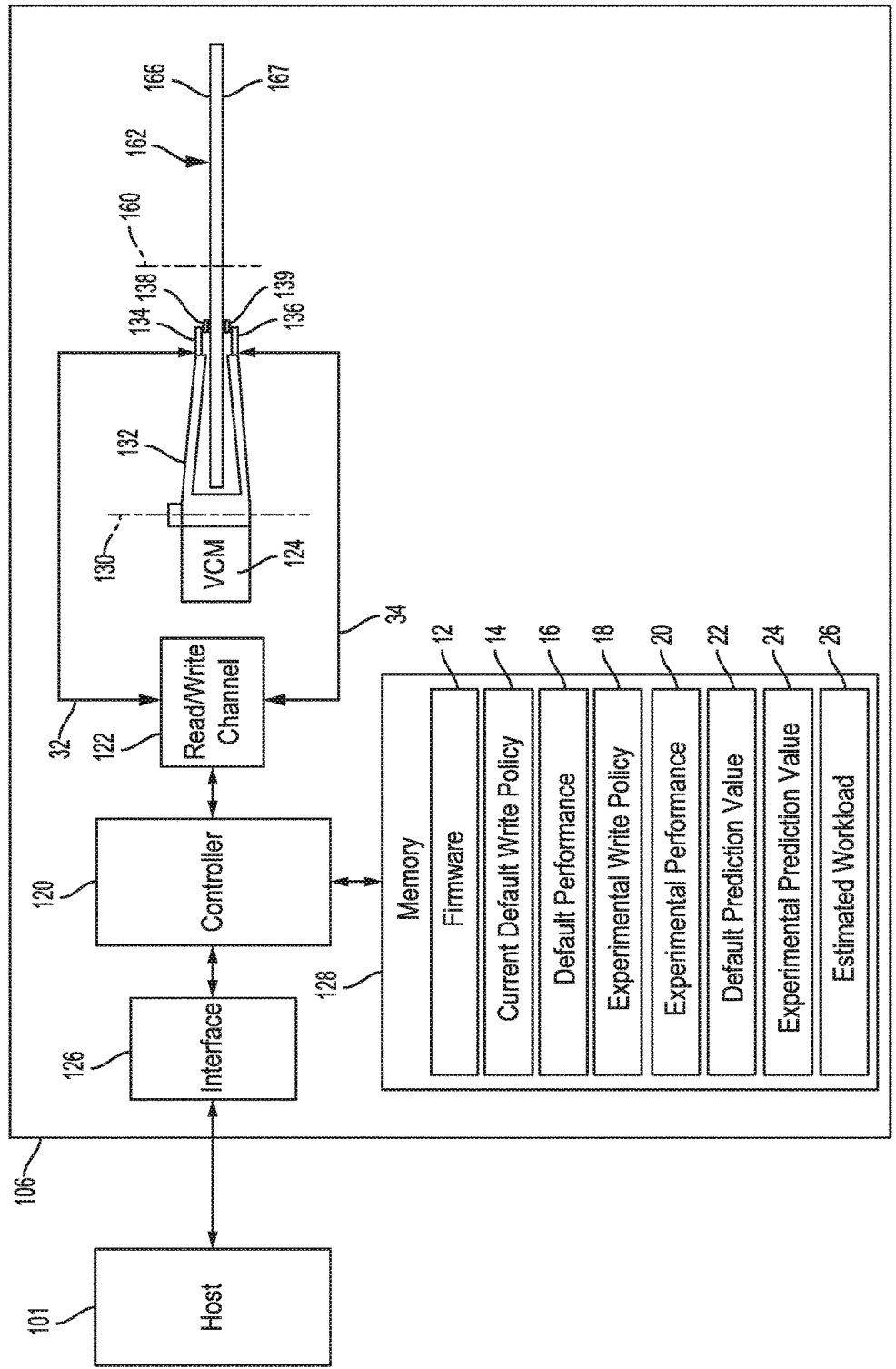
FIG. 1 is a block diagram of a Data Storage Device (DSD) that uses energy-assisted recording according to an embodiment.

FIG. 1 shows an example of Data Storage Device (DSD) 106 which communicates with host 101 according to an embodiment. Host 101 and DSD 106 may form a system, such as a computer system (e.g., server, desktop, mobile/laptop, tablet, smartphone, etc.), or other electronic device such as a Digital Video Recorder (DVR) or a Network Attached Storage (NAS) device. The components of FIG. 1 may or may not be physically co-located. In this regard, host 101 may be located remotely from DSD 106.

Those of ordinary skill in the art will appreciate that other embodiments can include more or less than those elements shown in FIG. 1 and that the disclosed processes can be implemented in other environments with different configurations. For example, other embodiments can include a different number of heads and/or disk surfaces than those shown in FIG. 1, such as a disk pack of multiple radially aligned disks above or below disk 162.

DSD 106 includes controller 120, which includes circuitry such as one or more processors for executing instructions and can include a microcontroller, a Digital Signal Processor (DSP), an Application-Specific Integrated Circuit (ASIC), a Field Programmable Gate Array (FPGA), hardwired logic, analog circuitry and/or a combination thereof. In some implementations, controller 120 can include a System on a Chip (SoC).

Interface 126 is configured to interface DSD 106 with host 101 via a bus or network, and may interface using, for example, Ethernet or WiFi, or a bus standard such as Serial Advanced Technology Attachment (SATA), PCI express (PCIe), Small Computer System Interface (SCSI), or Serial Attached SCSI (SAS). As will be appreciated by those of ordinary skill in the art, interface 126 can be included as part of controller 120.

As shown in the example of FIG. 1, DSD 106 includes a rotating magnetic disk 162 as a Non-Volatile Memory (NVM). Disk 162 is rotated by a spindle motor (not shown) about disk axis 160 and includes disk surfaces 166 and 167 as magnetic storage media on opposite sides of disk 162. Heads 138 and 139 are positioned so that a read element (e.g., read element 148 in FIG. 2) and a write element (e.g., write element 146 in FIG. 2) can read and write data, respectively, on a corresponding disk surface of disk 162. As used herein, a head can refer to a slider or other component of a DSD that includes a write element (e.g., write element 146 in FIG. 2) for magnetically writing data on a magnetic storage medium, such as disk surface 166 or 167. The data is written on disk surfaces 166 and 167 in radially spaced, concentric tracks (not shown) for storing data.

Heads 138 and 139 are connected to an end portion of Head Gimbal Assemblies (HGAs) 134 and 136, respectively. HGAs 134 and 136 are connected to a distal end portion of actuator arm 132, which is rotated by Voice Coil Motor (VCM) 124 about actuator axis 130 to position heads 138 and 139 in relation to tracks on disk surfaces 166 and 167, respectively. In some implementations, the positioning of the heads may also include one or more additional stages of actuator control, as in the example of piezoelectric actuators located toward the ends of actuator arm 132 to provide a second stage of actuation for finer positioning of the heads.

In the example of FIG. 1, controller 120 provides commands for accessing portions of disk 162 via a servo controller (not shown) and read/write channel 122. Those of ordinary skill in the art will appreciate that in some implementations, the servo controller and/or read/write channel 122 may form part of controller 120. The servo controller sends VCM commands to VCM 124 to control movement of actuator arm 132 in positioning heads 138 and 139 in relation to disk surfaces 166 and 167, respectively. In more detail, each of disk surfaces 166 and 167 can include servo wedges (not shown) that can provide location information (e.g., a servo burst) that can be read from the disk surface by a head to determine a position of the head. The servo controller or a spindle motor controller may also control rotation of disk 162 with a spindle motor control signal.

In addition, read/write channel 122 and/or other arm electronics (e.g., an arm electronics preamplifier) can provide write-assist signals 32 and 34 to heads 138 and 139, respectively. As discussed in more detail below with reference to FIG. 2, write-assist signals 32 and 34 control the turning on or off and/or a power level of at least one write-assistive component located on each of heads 138 and 139, respectively. The one or more write assist components can include, for example, a heater for adjusting a fly-height of the head over the disk surface for Thermal Fly-Height Control (TFC) during writing and/or reading, a laser diode for heating a disk surface for Heat Assisted Magnetic Recording (HAMR), and a microwave field generator, such as a microwave oscillator (e.g., a Spin Torque Oscillator (STO)) for generating a microwave field for Microwave Assisted Magnetic Recording (MAMR). The use of such write-assistive components allows for more data to be written on the disk surface in a given area, such as by writing the data in narrower tracks on the disk surface or with a greater linear density.

Memory 128 of DSD 106 is configured to store firmware 12, current default write policy 14, default performance 16, experimental write policy 18, experimental performance 20, default prediction value 22, experimental prediction value 24, and estimated workload 26. In some implementations, memory 128 can include a volatile memory such as Dynamic Random Access Memory (DRAM) with copies of one or more of the foregoing data sets or data structures stored in an NVM such as on disk 162 or another NVM of DSD 106, such as a non-volatile solid-state memory. In other implementations, memory 128 can be an NVM, such as a Magnetoresistive Random Access Memory (MRAM), or other type of non-volatile solid-state memory.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), MRAM, other discrete Non-Volatile Memory (NVM) chips, or any combination thereof.

Firmware 12 includes computer executable instructions for execution by controller 120 in operating DSD 106. As discussed in more detail below, controller 120 can execute firmware 12 to perform one or more experimental writes using experimental write policy 18 for at least one write-assistive component. Experimental write policy 18 can include, for example, multiple experimental write settings that affect an amount of power output by the at least one write-assistive components when performing the one or more experimental writes.

As used herein, experimental writes can include writes performed solely for the purpose of testing an experimental write policy, writes that are performed during a normal or routine operation of DSD 106 (e.g., when performing host write requests or otherwise unrelated maintenance operations) using an experimental write policy, or a combination of both dedicated test writes and normal operation writes. As discussed in more detail below, experimental writes may take place as a foreground or online activity and/or may take place as a background or offline activity.

The execution of firmware 12 by controller 120 can also allow for the identification of data written for the one or more experimental writes when reading data on the magnetic storage medium. Experimental performance 20 can include an evaluation of the one or more experimental writes indicating a signal quality of the read data and/or a latency in reading the data written by the one or more experimental writes.

Controller 120 can further determine experimental prediction value 24 based on experimental performance 20. Experimental prediction value 24 indicates a predicted usable life of head 138 or 139. Default prediction value 22 and experimental prediction value 24 can be based on default performance 16 and experimental performance 20, respectively. In addition, estimated workload 26 may be used to determine default prediction value 22 and experimental prediction value 24.

Estimated workload 26 can include, for example, an indication of an average number of write commands performed by the head during a given period of time or other indication that predicts an overall number of write commands to be performed by the head based on a monitored workload of the head. In some implementations, estimated workload 26 can also include an indication of an average number of read commands performed by the head during a given period of time or other indication that predicts an overall number of read and write commands to be performed by the head based on a monitored workload. In some cases, the read commands and write commands may be weighted to account for different amounts of wear resulting from performing read commands versus performing write commands. For example, read commands may be weighted less than write commands in determining estimated workload 26 to account for more wear on the head caused by write commands as compared to read commands.

Controller 120 may compare experimental prediction value 24 to default prediction value 22 to determine whether to change current default write policy 14 to experimental write policy 18 for performing future non-experimental writes. As used herein, non-experimental writes can include writes performed using a current default write policy as opposed to an experimental write policy. Current default write policy 14 can include, for example, a plurality of current or incumbent default settings for operating at least one write-assistive component when performing non-experimental writes on the disk surface. Based on the comparison of default prediction value 22 to experimental prediction value 24, controller 120 may determine to change current default write policy 14 for future non-experimental writes. As discussed in more detail below, the default write policy can be a current or incumbent write policy that can change over the life of DSD 106 to balance short term performance with long term reliability.

The present disclosure ordinarily allows for extending the life of heads that use energy-assisted recording, such as TFC, HAMR, and/or MAMR techniques. As discussed in more detail below, the processes in the present disclosure can adjust a current default write policy for at least one write-assistive component based on experimental prediction value 24 indicating a usable life of the head.

For example, experimental write policy 18 used to perform the one or more experimental writes can include a lower heater current for a heater and a lower bias voltage for an STO so that less power or heat is generated at head 138, and with head 138 flying at a greater fly-height over disk surface 166. If experimental performance 20 meets a threshold performance level and experimental prediction value 24 indicates a longer usable life for head 138 using experimental write policy 18 instead of current default write policy 14, controller 120 may replace current default write policy 14 with experimental write policy 18 as the new default write policy to extend the usable life of head 138.

In operation, controller 120 receives host read and write commands from host 101 via interface 126 for reading data from and writing data on disk surfaces 166 and 167 of disk 162. In response to a write command from host 101, controller 120 may buffer the data to be written for the write command in a write cache of memory 128 or another memory. For data to be written on a disk surface, a write channel of read/write channel 122 may encode the buffered data into a write signal, which is provided to a head for magnetically writing data on a disk surface that has been assigned logical addresses for the data in the write command. In addition, controller 120 via a servo controller can provide VCM commands to VCM 124 to position a head over a particular track for writing the data.

In response to a read command for data stored on disk surface 166 or 167 of disk 162, controller 120 via the servo controller positions a head over a particular track on the disk surface that has been assigned logical addresses for the data in the read command. Controller 120 controls the head to magnetically read data stored in the track, and to send the read data as a read signal to a read channel of read/write channel 122. Read/write channel 122 can then decode and buffer the data into a read cache of memory 128 or another memory for transmission to host 101 via interface 126.

Figure 2:
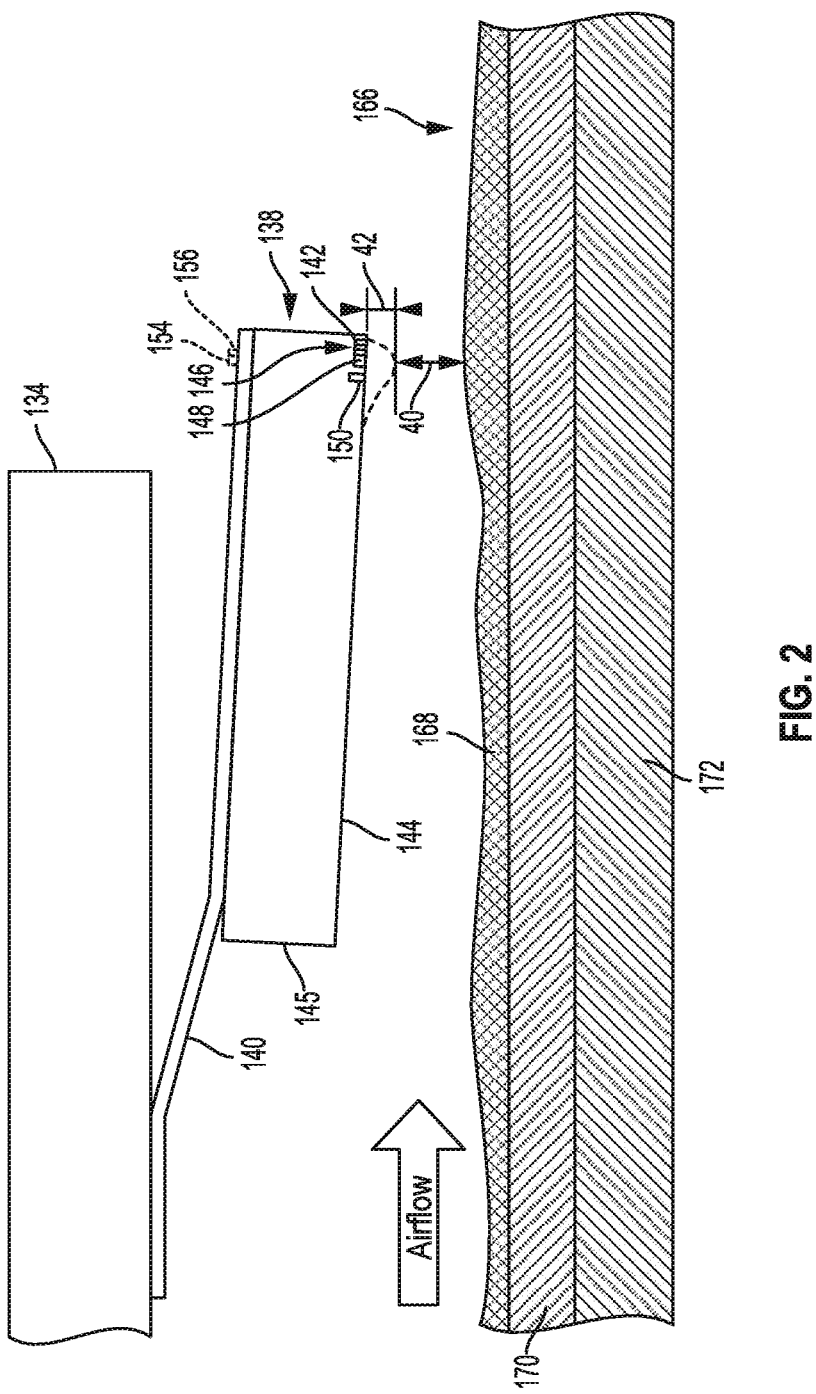
FIG. 2 is a close-up view of a head including at least one write-assistive component when flying over a disk surface of the DSD of FIG. 1.

FIG. 2 is a close-up view of head 138 of DSD 106 from FIG. 1 including multiple write-assistive components when flying over disk surface 166. As shown in FIG. 2, head 138 is connected HGA 134 by elastic flexure 140, which supports head 138 on HGA 134. Elastic flexure 140 also includes wiring for operating head 138 and for controlling the operation of heater 150, STO 142, and optional laser diode 154.

Head 138 includes leading edge 145 and ABS 144. Airflow moves in the direction indicated by the arrow labeled "Airflow," and leading edge 145 encounters airflow before a trailing edge of head 138, which floats over disk surface 166. Head 138 also includes read element 148 for magnetically reading data from disk surface 166, and write element 146 for magnetically writing data on disk surface 166.

As shown in FIG. 2, head 138 includes heater 150 to lower the fly-height of a portion of head 138 by heating the portion including read element 148 and write element 146 so that this portion of head 138 deforms or protrudes toward disk surface 166, as indicated in FIG. 2 with dashed lines. The fly-height is then reduced by distance 42 to TFC distance 40 due to the thermal expansion of head 138 toward disk surface 166. TFC distance 40 may be on the scale of only a few nanometers in some DSDs.

As will be appreciated by those of ordinary skill in the art, other implementations of head 138 may include a different arrangement of write element 146, read element 148, and heater 150 than the example shown in FIG. 2. For example, in some implementations, heater 150 may be located between write element 146 and read element 148. In yet other implementations, head 138 may include two heaters 150 such that a respective heater of the pair of heaters 150 is controlled for each of write element 146 and read element 148. In another implementation, a pair of heaters 150 may provide two stages of heating.

The example of head 138 in FIG. 2 also includes STO 142 located between a write pole of write element 148 and a trailing magnetic shield of head 138. When powered, STO 142 generates a microwave field that facilitates the switching of the magnetization of magnetic grains in recording layer 172 of disk surface 166. In some cases, the microwave field generated by STO 142 may also increase the coercivity of recording layer 172 against becoming demagnetized to allow for a reduction in the size of the magnetic grains in recording layer 172, and a corresponding increase in data density.

Head 138 is also shown as optionally including laser diode 154 and optics 156 for heating a portion of disk surface 166 when writing data on disk surface 166. Optics 156 may include, for example, a waveguide to direct energy from laser diode 154 toward ABS 144, and onto disk surface 166.

Current default write policy 14 and experimental write policy 18 can each include various control settings for adjusting the power output by heater 150, STO 142, and laser diode 154. For example, current default write policy 14 and experimental write policy 18 can include heater current settings for heater 150 and bias voltages for STO 142 that are applied to heater 150 and STO 142, respectively, when writing data on disk surface 166. These settings may also include a different settings or gains for different radial locations on disk surface 166 (e.g., an Inner Diameter (ID) region, a Mid-Diameter region (MD), and an Outer-Diameter (OD) region) on disk surface 166, which may benefit from slightly different amounts of power output by the energy-assistive components.

Those of ordinary skill in the art will appreciate that other implementations may include a different arrangement of write-assistive components than those shown in FIG. 2 or different write-assistive components. For example, some implementations may only include one of heater 150, STO 142, or laser diode 154. As another example, some implementations may include a different type of microwave generator or oscillator than an STO, or a different type of write-assistive component for heating disk surface 166 other than a laser diode. In addition, the locations of components, including the write-assistive components, shown in FIG. 2 may vary in different implementations.

Disk surface 166 includes a layer of lubricant 168, that may include, for example, a perfluoroplyether (PFPE) lubricant. In the example of FIG. 2, disk surface 166 further includes protective overcoat layer 170 to protect recording layer 172. As noted above, recording layer 172 can be magnetized by write element 146 to record data, and can be magnetically read by read element 148. Overcoat layer 170 may be a carbon-based layer and serve to protect recording layer 172 from corrosion and to improve the durability of disk 162. Recording layer 172 may include one or more layers of an alloy, such as a cobalt, chromium, and platinum alloy that includes magnetic grains that are magnetized by write element 146.

Example Write Policy Processes

Figure 3:
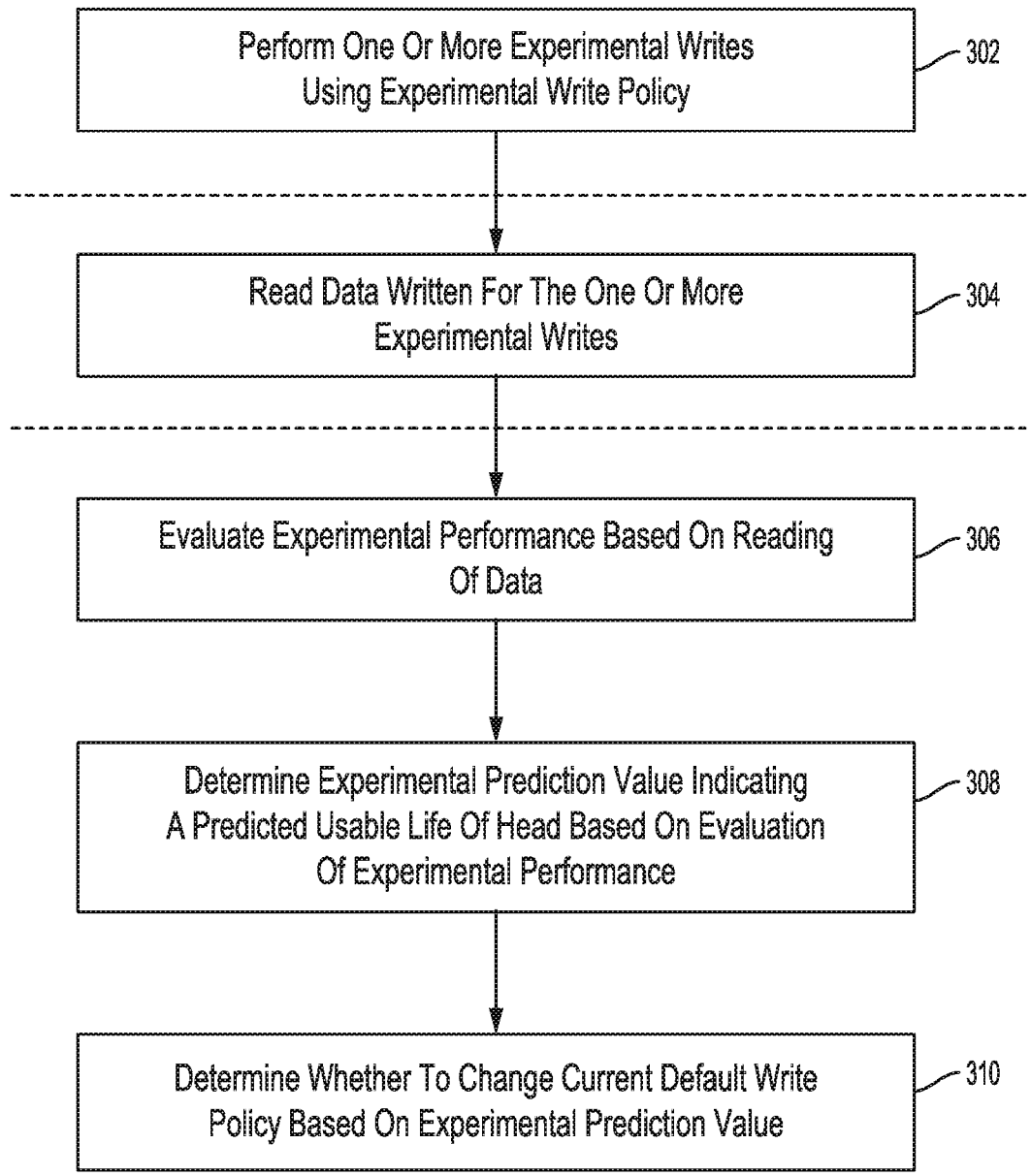
FIG. 3 is a flowchart for a write policy test process according to an embodiment.

FIG. 3 is a flowchart for a write policy test process that can be performed by controller 120 executing firmware 12 according to an embodiment. The process of FIG. 3 can be performed periodically in the field, such as after a certain number of writes performed by a head or after a predetermined period of time, such once a day or once a week. The frequency of performing the write policy test process of FIG. 3 may also depend on the workload of a head or the DSD, such that more frequently used heads or DSDs may result in more frequent testing.

In block 302, controller 120 performs one or more experimental writes on a magnetic storage medium (e.g., disk surface 166 in FIG. 2) using experimental write policy 18. In some implementations, controller 120 may perform thousands of experimental writes at different radial locations on a disk surface. The experimental writes can be performed over a period of time and interspersed with non-experimental writes. The experimental write or writes in block 302 may be performed as a foreground activity of DSD 106 when performing user write requests or may be performed as a background activity, such as when performing a maintenance operation of DSD 106.

In this regard, the data written for the experimental writes can be user data or other data that is written during the course of operation of DSD 106, as opposed to being special test data written only for experimental writes. The experimental writes may include, for example, performing writes to disk surface 166 that are requested by host 101. In other cases, the experimental writes may include, for example, performing writes to disk surface 166 for a maintenance operation of DSD 106, such as by refreshing or rewriting tracks that may be susceptible to Adjacent Track Interference (ATI), or by performing Garbage Collection (GC) to reclaim portions of the disk surface that store invalid or obsolete data. In some implementations, GC may include reading valid data from the disk surface and rewriting the valid data to another location on the disk surface.

The inclusion of the experimental writes in performing normal operations of DSD 106 can reduce the performance penalty or overhead in performing the experimental writes, since such data would otherwise need to be written, regardless of whether the write is performed as an experimental write or as a non-experimental write. However, other implementations may write specific test data, such as a test pattern, for experimental writes, as opposed to data that would otherwise be written during the normal operation of DSD 106.

In some implementations, experimental write policy 18 for performing the one or more experimental writes can be a slight or relatively small deviation from current default write policy 14, which is used for normal or non-experimental writes. This can allow for a certain level of reliability for the data written by the experimental writes, since it is likely that relatively small changes (e.g., within 10%) or fine-tuning of the amount of power output by the at least one write-assistive component will not critically affect the reliability of the data written. However, the change between current default write policy 14 and experimental write policy 18 is typically determined to be enough so as to detect a difference in signal quality when later reading the data written for the one or more experimental writes.

As discussed in more detail below, certain heads may be able to reduce the amount of power output by one or more write-assistive components and still write data with an acceptable level of reliability in terms of being able to later read the data. In this regard, the determination of experimental write policy 18 may have upper and lower bounds or a range to maintain a certain level of reliability for the experimental writes. Reductions to the power output by the one or more write-assistive components can result in a longer usable life of the head, since the head will be exposed to less damaging heat or fly at a higher distance above the magnetic storage medium.

In block 304, the data written in block 302 for the one or more experimental writes is read. The reading of the data may occur relatively soon after writing the data in block 304 or may occur much later than when the data was written, with numerous other non-experimental writes having taken place since the experimental write or writes. As with performing the experimental writes, the reading of the data written for the experimental writes may occur during the normal operation of DSD 106 to reduce an impact of the write policy test process. This optional break in the process is indicated in FIG. 3 by the dashed line between blocks 302 and 304.

As discussed in more detail below with reference to the experimental write identification process of FIG. 7, controller 120 may identify the data written for experimental writes from among other data read for non-experimental writes by identifying an indicator of the experimental write policy included with the data written on the magnetic storage medium. In some implementations, the indicator can include a bit in a header used for metadata that can indicate whether the data being read was written as an experimental write. An address or addresses for the data, such as Logical Block Addresses (LBAs) can be used in some implementations to associate the experimental write policy used to write the data with the data identified as being written for an experimental write. In some examples, a hash table may be used with the addresses of the data to associate an experimental write policy with the read data.

In block 306, controller 120 evaluates an experimental performance of the one or more experimental writes based on the reading of the data written for the one or more experimental writes. The experimental performance may consider at least one of a signal quality for the read data and a latency in reading the data. For example, controller 120 may use a Local Accumulator Count (LAC) provided by read/write channel 122 representing an amount of error correction needed when reading the data by indicating how much of a local parity was needed to error correct the read data. In such an example, a higher LAC would indicate a lower signal quality, since more error correction was needed to correct the read data. As will be appreciated by those of ordinary skill in the art, other ways of determining or quantifying a signal quality are possible.

Controller 120 may also consider the latency in reading the data or an average latency in reading data from multiple experimental writes, which may indicate a reliability of the experimental write policy. A relatively long delay in completing read commands can indicate that the data may not have been read during a first attempt to read the data, and that one or more read retries were needed to read the data.

The evaluation of the experimental performance in block 306 may occur soon after the data is read in block 304 or may occur much later, as indicated by the dashed line between blocks 304 and 306 in FIG. 3 indicating an optional break in the process. In some implementations, controller 120 may wait to evaluate the performance of all of the experimental writes for a given experimental write policy by accessing experimental performance 20, which may include, for example, LAC values and/or latency values for the experimental writes performed using experimental write policy 18. In other implementations, controller 120 may evaluate the experimental performance after data for a threshold number of experimental writes has been read.

In this regard, experimental performance 20 may have a finite number of slots or entries for recording the performance of experimental writes. In such implementations, controller 120 may slow the rate of performing experimental writes being interspersed with non-experimental writes in block 302 to allow more time to reclaim slots or entries corresponding to experimental write policies that have previously been evaluated. In cases where the experimental write policy is adopted as a new default write policy, reclaiming slots or entries in experimental performance 20 can include releasing or setting the corresponding slots or entries as available to be overwritten or otherwise erasing the evaluated performance of the experimental writes written using the previously evaluated experimental write policy. In cases where the experimental write policy is not adopted as the new current default write policy, controller 120 may rewrite the data previously written with the rejected experimental write setting if the data from such experimental writes cannot be read with an acceptable level of performance. The corresponding slot or entry in experimental performance 20 may then be released or set as available to be overwritten or otherwise erased after the data has been rewritten using the current default write setting.

In block 308, controller 120 determines experimental prediction value 24 indicating a predicted usable life of the head based on the evaluation of the experimental performance in block 306. As discussed in more detail below, controller 120 may determine experimental prediction value 24 using an expected or estimated deterioration in the performance of the head from the performance evaluated for the experimental writes using experimental write policy 18.

Estimated workload 26 can also be used in determining experimental prediction value 24 by adjusting the expected or estimated deterioration in performance. For example, controller 120 may monitor or track the amount of data access for the head during a period of time to represent a data access rate for the head in performing writes and reads. As noted above, some implementations may weight writes more heavily than reads or may only track the number of writes performed by the head during a period of time. A remaining workload can be estimated for the head for performing future writes, such as during a remaining time in a warranty period or other specification for DSD 106, by using the monitored workload. The evaluated performance for the experimental writes may then be decreased or reduced at a rate corresponding to estimated workload 26 and experimental write policy 18 until reaching a threshold performance where the head would be considered defective or otherwise unreliable for writing data. Experimental prediction value 24 would then indicate the predicted usable life for the head if experimental write policy 18 were used as a new default write policy.

In block 310, controller 120 determines whether to change current default write policy 14 based on experimental prediction value 24 determined in block 308. In some implementations, controller 120 may compare experimental prediction value 24 to default prediction value 22 indicating a predicted usable life of the head if current default write policy 14 is continued to be used for future non-experimental writes. Although current default write policy 14 may provide a higher initial baseline for its default performance (e.g., default performance 16) than experimental performance 20, the default performance is estimated to decrease or reduce at a faster rate than experimental performance 20 for a given workload due to the greater amount of heat and/or the lower fly-height resulting from using current default write policy 14 as compared to experimental write policy 18. In this regard, controller 120 in determining whether to change default write policy can consider the tradeoff between a current performance and a future performance or long term reliability.

In some implementations, controller 120 may further determine whether experimental prediction value 24 exceeds default prediction value 22 by more than a predetermined amount while ensuring that experimental performance 20 exceeds a minimum level of performance. If so, controller 120 may replace default write policy 14 with experimental write policy 18 as a new default write policy.

The foregoing write policy test process can ordinarily allow DSD 106 to increase the usable life of heads that use write-assistive components, while still ensuring a minimum level of performance in terms of reliably reading and writing data. In addition, the foregoing process ordinarily allows for the customization or tailoring of write policies for different heads to the particular characteristics and actual performance of the head to provide a longer usable life for the head. The particular characteristics, operating conditions, and actual performance can vary from head to head due to differences in construction, use, and materials of the heads and their corresponding disk surfaces.

Figure 4:
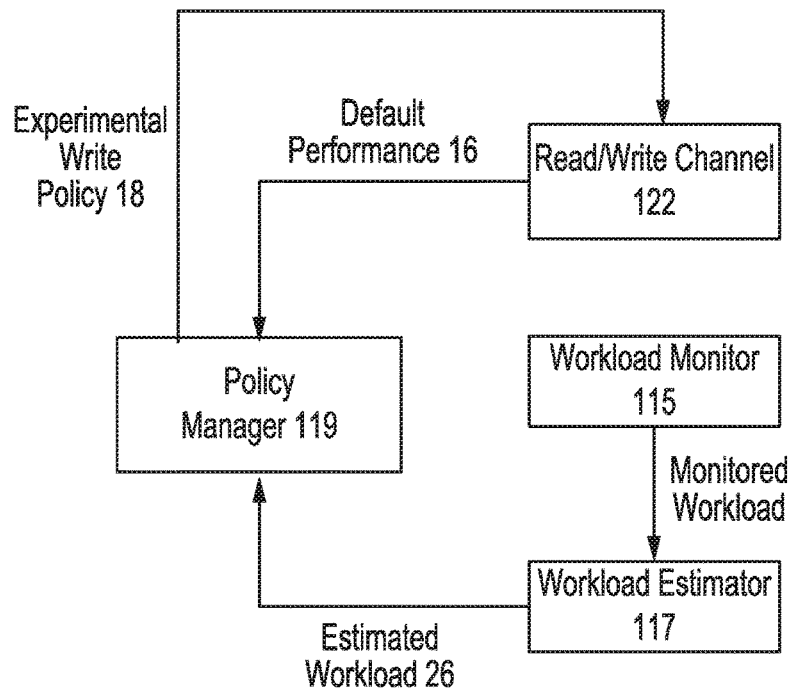
FIG. 4 is a block diagram depicting components and modules for determining an experimental write policy according to an embodiment.

FIG. 4 is a block diagram depicting components and modules for determining experimental write policy 18 according to an embodiment. As shown in FIG. 4, default performance 16 is collected from read/write channel 122 in DSD 106. In some implementations, default performance 16 may be first stored in a memory, such as in memory 128 of DSD 106 in FIG. 1. Default performance 16 can include, for example, an average LAC and/or an average latency for read operations performed when reading data previously written for non-experimental writes.

Policy manager 119 in FIG. 4 receives default performance 16 and determines experimental write policy 18 based on default performance 16. In one example, policy manager 119 may set a more aggressive experimental write policy that allows for less power to be output by at least one write-assistive component than another experimental write policy in a case where default performance 16 is relatively high with a low LAC and a low latency. In other cases, policy manager 119 may select a less aggressive experimental write policy that provides less of a decrease in the amount of power output by the at least one write-assistive component if default performance 16 is not much greater than a lower or critical threshold performance for the head in terms of LAC and/or read latency.

In order to improve the determination of experimental write policy 18, policy manager 119 may also use Machine Learning (ML) over the course of multiple iterations of setting different experimental write policies and evaluating the performance of the experimental writes. In some implementations, the ML may use a reinforcement learning technique of a class of unsupervised learning. The use of ML in determining experimental write policy 18 can ordinarily allow for a faster optimization of default write policy 14 by determining better experimental write policies with each iteration.

Each of current default write policy 14 and experimental write policy 18 can include respective sets of write settings adjusted for different radial locations on a disk surface, such as disk surface 166. For example, policy manager 119 can interpolate between a first write setting for an OD region of disk surface 166 and an ID region of disk surface 166 to determine intermediate write settings of experimental write policy 18 for other regions on disk surface 166. In addition, current default write policy 14 and experimental write policy 18 can include write settings for multiple write-assistive components, such as for both heater 150 and STO 142 of head 138.

In this regard, controller 120 in determining an experimental write policy for multiple write-assistive components may balance the adjustment of different write settings for the respective write-assistive components. For example, controller 120 may decrease a first write setting to a greater degree (e.g., a 5% decrease) as compared to a decrease in a second write setting (e.g., a 2% decrease) if previous experimental write performances suggest that decreasing the first write setting deteriorates performance less and/or increases an expected usable life of the head as compared to decreasing the second write setting. In other examples, increasing a first write setting for a first write-assistive component, while decreasing a second write setting for a second write-assistive component may be determined to provide a longer usable life with the same or better performance.

In the case of a fly-height heater, a heater current for performing writes may be adjusted with respect to a heater current for performing reads to obtain a desired tradeoff between performance and reliability. For example, a higher heater current during writing may allow a higher fly-height with a lower heater current during reading since the signal quality of the read data is better due to the higher current during writing. In such an example, the lower heater current during a greater number of reads as compared to writes over the life of the head can provide for a longer usable life of the head due to the higher fly height during the more numerous reads to result in less overall interaction with the disk surface and accumulation of disk lubricant on the head.

In some implementations, policy manager 119 may also designate an area or areas for performing one or more experimental writes for testing experimental write policy 18. For example, policy manager 119 may designate one or more MBCs on disk surface 166 for performing experimental writes for a maintenance operation such as a write refresh operation or for temporarily relocating valid data to be rewritten in a new location as part of a GC process. In other examples, policy manager 119 may designate an equal number of experimental writes to be performed in different regions of disk surface 166, such as within an ID region, an MD region, and an OD region of disk surface 166.

In determining experimental write policy 18, policy manager 119 can use estimated workload 26 received from workload estimator 117. Estimated workload 26 can include, for example, a value that indicates an expected amount of use of the head for writing data during a future time period, such as during a remaining amount of time in a warranty period of DSD 106. Estimated workload 26 may, in some implementations, be used to select a gain for adjusting how aggressively to set write settings of experimental write policy 18, in addition to considering default performance 16 received from read/write channel 122. In the example of FIG. 4, estimated workload 26 is estimated by workload estimator 117 using a monitored workload received from workload monitor 115.

In some implementations, workload estimator 117 may consider a current age of DSD 106, such as a time since DSD 106 has been in operation. For example, workload estimator 117 may consider the monitored workload during the first six to twelve months of the DSD's operation to be the highest workload for write operations over the life of DSD 106, with this write workload stabilizing during the following two years, and then steadily declining. Workload estimator 117 may provide an estimated workload to the policy manager indicating a cumulative number of writes expected to be performed for the remainder of a predetermined time period.

In some implementations, workload estimator 117 or workload monitor 115 may also be used to provide an indication to host 101 that certain heads or disk surfaces are being more heavily used than other heads or disk surfaces. In such implementations, workload estimator 117 or workload monitor 115 may provide an indication, such as an LBA range, so that host 101 can remap the more heavily used LBAs to heads or disk surfaces that are less frequently accessed to level the wear on the heads of DSD 106. In some cases, the remapping may be performed as part of a maintenance operation such as GC.

In addition, workload monitor 115 or workload estimator 117 may identify frequently rewritten addresses that can be cached, such as in memory 128 or in a MBC on a different disk surface, so as to reduce the wear on heads that would otherwise perform the write operations for the frequently written addresses. In other examples, frequently written data such as volatile data may be cached in a memory of host 101 so that multiple writes can be made locally in the cache before being flushed to DSD 106 to reduce the wear on the head.

Those of ordinary skill in the art will appreciate that other implementations may include a different arrangement of modules and components than shown in FIG. 4. For example, other implementations may combine workload monitor 115 and workload estimator 117 or may combine policy manager 119 and workload estimator 117.

Figure 5:
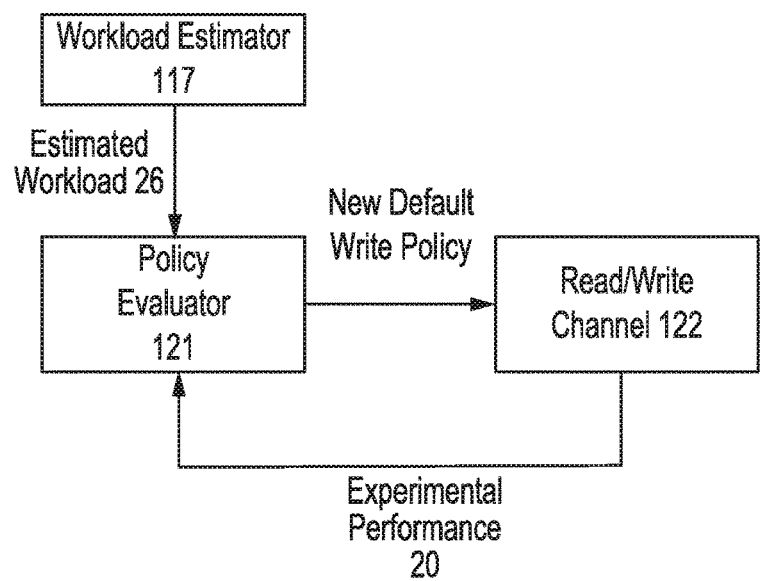
FIG. 5 is a block diagram depicting components and modules for evaluating an experimental write policy according to an embodiment.

FIG. 5 is a block diagram depicting components and modules for evaluating an experimental write policy according to an embodiment. As shown in FIG. 5, read/write channel 122 provides experimental performance 20 to policy evaluator 121, which evaluates the performance of one or more experimental writes based on experimental performance 20. As noted above, experimental performance 20 can include an indication of signal quality when reading data written for the one or more experimental writes and/or a latency in reading such data. In some implementations, experimental performance 20 may first be stored in a memory before being accessed by policy evaluator 121, such as in memory 128.

In evaluating experimental performance 20, policy evaluator 121 can determine experimental prediction value 24 indicating a predicted usable life of the head based on experimental performance 20. Policy evaluator 121 may also determine default prediction value 22 based on default performance 16. For both prediction values, policy evaluator 121 may use, for example, a Weibull distribution to determine the indication of the usable life of the head. In addition, policy evaluator 121 can use estimated workload 26 for determining both prediction values. As discussed above, estimated workload 26 can indicate an estimated amount of use that remains for the head during a predetermined time period.

In some implementations, policy evaluator 121 compares experimental prediction value 24 to default prediction value 22 to determine whether current default write policy 14 or experimental write policy 18 is expected to provide a longer usable life for the head. As noted above, some experimental write policies may adjust a first write setting for a first write-assistive component to a lower power output (e.g., a lower current for heater 150 in FIG. 2), while adjusting a second write setting for a second write-assistive component to a higher power output (e.g., a higher bias voltage for STO 142) to compensate for a performance loss due to the change in the first write setting. In other words, the write settings for the write-assistive components may be adjusted in either direction to output more or less power to obtain a desired tradeoff between performance and predicted usable life.

By dynamically performing and evaluating experimental writes at different points in the life of DSD 106, it is ordinarily possible to obtain better predictions of a remaining usable life of a particular head based on the actual workload for the head, the actual and present characteristics of the head (e.g., including manufacturing or material variations due to actual use in the field), and the actual operating conditions of the head. In this regard, the measured performance in the field can indicate the actual state of wear on the head. This is in contrast to using a fixed lifetime estimate for a typical head for all of the heads in DSD 106.

Due to the need to provide a margin of safety, most heads are likely to experience much less use than the maximum designed use specified for a head. The present disclosure allows for the actual performance margin or margin of safety for a specific head to be measured in the field for different write-assistive policies, and then trade some of the excess performance margin for a longer operating life of the head. For example, the built-in margin for the deterioration in performance over the life of a head will typically result in a higher fly-heater current, a higher bias voltage for an STO, and/or a higher laser diode current at most stages throughout the life of a head than what is needed to meet an acceptable write performance. By measuring the actual performance of the head when using different experimental write settings, it is ordinarily possible to slow the deterioration of the head due to energy-assisted recording.

If policy evaluator 121 determines that experimental write policy 18 is predicted to provide a longer usable life for the head with an acceptable performance (e.g., under a maximum LAC and within an average range for read latency), policy evaluator 121 can set experimental write policy 18 as a new, current default write policy for read/write channel 122 for performing future non-experimental writes. For example, if experimental prediction value 24 indicates a longer usable life than default prediction value 22, policy evaluator 121 can replace current default write policy 14 with experimental write policy 18.

Figure 6:
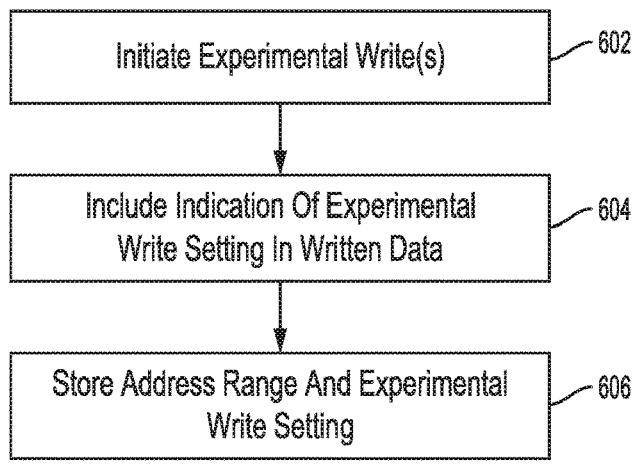
FIG. 6 is a flowchart for an experimental write process according to an embodiment.

FIG. 6 is a flowchart for an experimental write process that can be performed by controller 120 executing firmware 12 according to an embodiment. The process of FIG. 6 can be performed periodically throughout the life of DSD 106 to test different experimental write policies. Iterations of the process of FIG. 6 may be performed over a period of operation of DSD 106 to perform multiple experimental writes spread out in time and location on the magnetic storage medium using the same experimental write policy. In other implementations, iterations of the process of FIG. 6 may be performed in series to test an experimental write policy as a background activity of DSD 106.

In block 602, controller 120 initiates one or more experimental writes on disk surface 166. As discussed above, the experimental write or writes using experimental write policy 18 may be interspersed with non-experimental reads and/or non-experimental writes that use current default write policy 14. In some cases, the experimental writes may be set to occur for a certain number of writes in different regions or zones on disk surface 166, such as when requests to write user data are received for addresses located in an ID region, MD region, or OD region of disk surface 166. Controller 120 may also select writes for using experimental write policy 18 based on a length or amount of data to be written to ensure that enough data is written to sufficiently evaluate the performance of the experimental write when the data is later read.

In block 604, an indication of the experimental write policy is included with the data written on disk surface 166. In some implementations, the indication can be included as metadata written with the experimental write. For example, a bit in a header that may precede the user data can indicate that the write was performed using an experimental write policy. The header, in some implementations, may also include an address range for the data written using the experimental write policy.

In block 606, controller 120 stores the address range (e.g., an LBA range) for the data written using experimental write policy 18. The address range for the data may be stored, for example, in memory 128 of DSD 106 or in another memory where the experimental writes are tracked. The address range may be associated with experimental write policy 18 using a pointer or other indicator. As discussed above, some implementations may use a hash table to associate the address range or other indication of the addresses written for experimental writes so that they can be identified quickly when the data is later read and determined to have been written for an experimental write.

Figure 7:
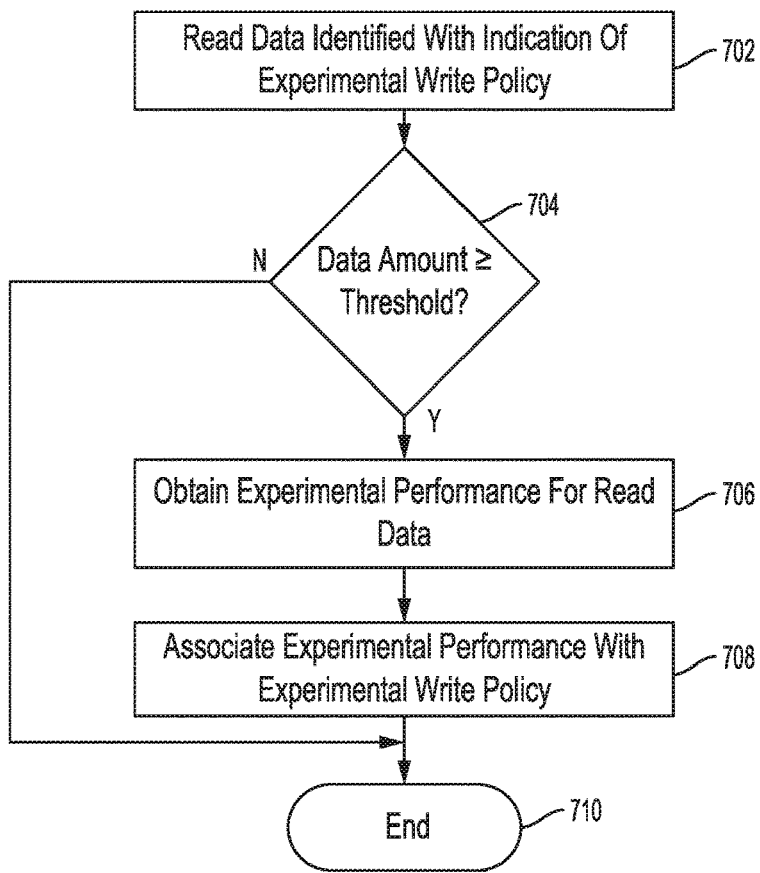
FIG. 7 is a flowchart for an experimental write identification process according to an embodiment.

FIG. 7 is a flowchart for an experimental write identification process according to an embodiment. Iterations of the process of FIG. 7 can be performed throughout normal operation of DSD 106 in servicing read requests or in performing maintenance operations such as refreshing or rewriting tracks or performing GC. In addition, iterations of the process of FIG. 7 may be spread out in time to read data in multiple locations on the magnetic storage medium for the same experimental write policy 18. In other implementations, iterations of the process of FIG. 7 may be performed in series to read data written using experimental write policy 18.

In block 702, data is read and identified as having been written for an experimental write using an indication of the experimental write policy included with the read data. In block 704, controller 120 determines whether an amount of data read in block 702 is greater than or equal to a threshold amount of data for storing experimental performance data for the read data. In some implementations, controller 120 may determine whether a range of addresses for the data read in block 702 is greater than or equal to a threshold number of addresses.

If it is determined in block 704 that the amount of data read is not greater than or equal to the threshold, the process of FIG. 7 ends in block 710. On the other hand, if it is determined that enough data has been read, controller 120 in block 706 obtains experimental performance data for the read data. This can include, for example, obtaining an LAC and/or a read latency indication from read/write channel 122.

In block 708, the experimental performance data obtained in block 706 is associated with an experimental write policy used for writing the read data. In some implementations, this association may be performed by using a hash table with one or more addresses (e.g., LBAs) for the read data. The associated performance data can be stored as, for example, experimental performance 20 to be accessed later on by controller 120 when evaluating the performance of experimental writes written with experimental write policy 18.

Figure 8:
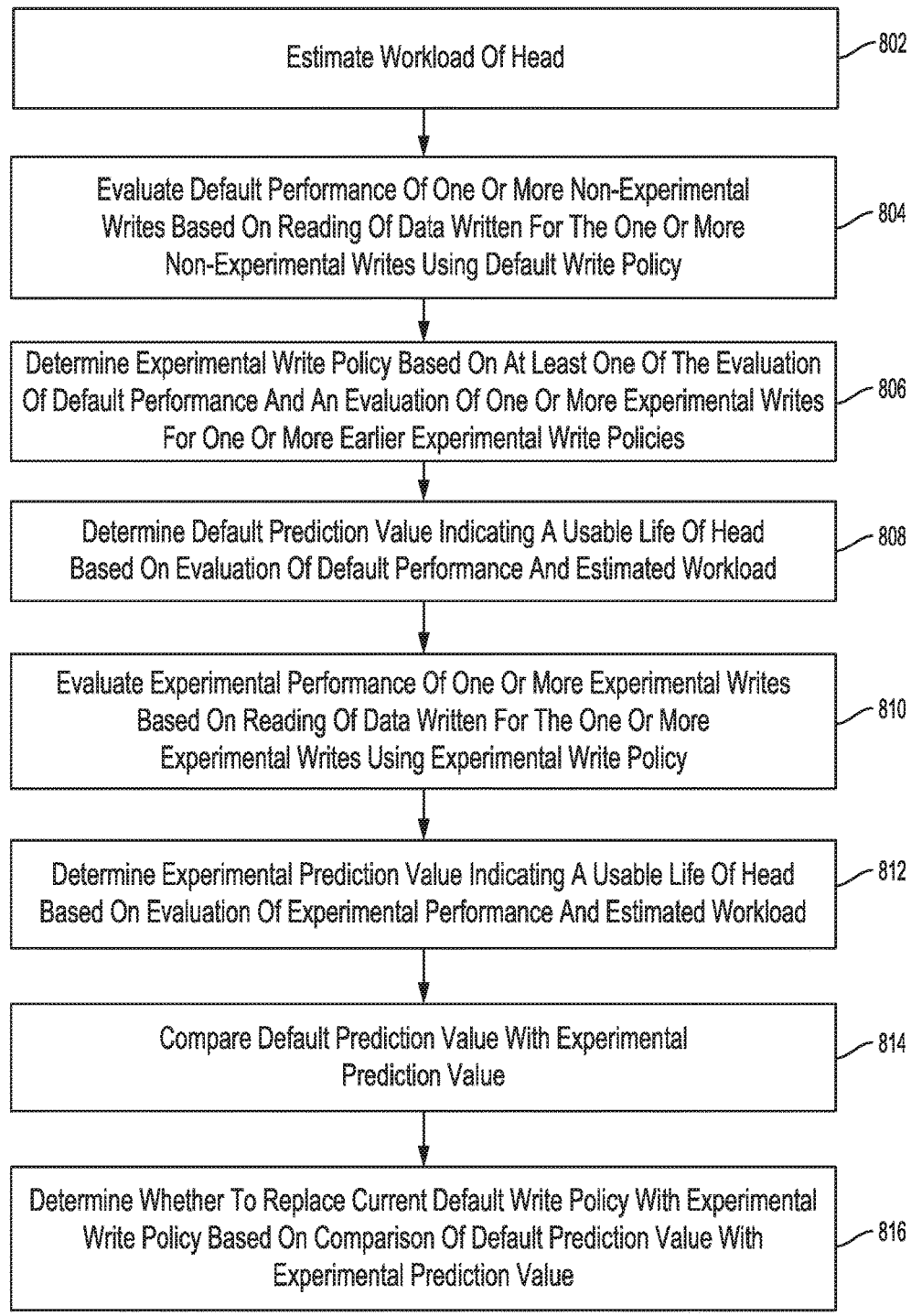
FIG. 8 is a flowchart for a default write policy determination process according to an embodiment.

FIG. 8 is a flowchart for a default write policy determination process that can be performed by controller 120 executing firmware 12 according to an embodiment. As with the write setting process of FIG. 3 discussed above, the process of FIG. 8 can be performed periodically in the field, such as after a certain number of writes performed by a head or after a predetermined period of time, such as, for example, every other day, once a day, or once a week.

In block 802, controller 120 estimates a workload of the head (e.g., estimated workload 26) in performing writes on disk surface 166. The estimated workload can be based on a monitored workload for the head in performing previous writes, such as a total amount of data or addresses written for the head since beginning operation or for a given period of time, such as an amount of data or addresses written in the past week or day.

In block 804, controller 120 evaluates default performance 16 for one or more non-experimental writes based on the reading of data written using current default write policy 14. As noted above, default performance 16 can include an indication of a signal quality (e.g., an LAC) and/or a read latency for data read that was not written as an experimental write.

In some implementations, the evaluation of default performance 16 can include determining whether default performance 16 exceeds a critical level of performance by at least a certain amount. This can indicate that there may be an excess performance or an excess margin of safety that can be traded for a longer usable life of the head by using an experimental write policy that results in less power being output by at least one write-assistive component of the head.

In block 806, controller 120 determines experimental write policy 18 based on at least one of the evaluation of default performance 16 in block 804 and an evaluation of one or more earlier experimental writes for one or more earlier experimental write policies. As noted above, some implementations may use ML, such as a reinforcement learning technique and/or unsupervised learning, to determine experimental write policy 18 by analyzing previously obtained experimental performance data for other experimental write policies. In this regard, controller 120 may find that adjusting a first write setting of experimental write policy 18 for a first write-assistive component has less of a negative impact on experimental performance 20 than adjusting a second write setting for a second write-assistive component. In such cases, controller 120 may decide to adjust the write setting for the first write-assistive component to a greater degree than the write setting for the second write-assistive component, since changes to the first write setting have less of a negative effect on the performance of the head.

Controller 120 may also consider estimated workload 26 in determining experimental write policy 18. Estimated workload 26 can include an indication of the amount of writing or reading and writing that the head is expected to perform for a future period of time. A current age of DSD 106 may be used in determining estimated workload 26, since DSD 106 may be predicted to perform more or less operations in the future than a previously monitored workload based on the stage of life for DSD 106. For example, DSD 106 may be predicted to perform more writes during an initial stage of its life (e.g., within its first year of operation) such that the rate of writes performed by the head is expected to decrease in later stages of life.

In block 808, controller 120 determines default prediction value 22 indicating a usable life of the head if continuing to use current default write policy 14. In the example process of FIG. 8, controller 120 uses the evaluation of default performance 16 and estimated workload 26 to determine default prediction value 22. In some implementations, default prediction value 22 may be updated from a previous default prediction value to account for more recent changes in the default performance and/or the estimated workload.

In block 810, controller 120 evaluates experimental performance 20 for one or more experimental writes based on the reading of data written for the one or more experimental writes while using experimental write policy 18. Experimental performance 20 can include the same type of measurements used for default performance 16, such as an average LAC and an average read latency in reading the data written for the experimental writes.

In block 812, controller 120 determines experimental prediction value 24 indicating a predicted usable life of the head if experimental write policy 18 is used in place of default write policy 14. In the example process of FIG. 8, controller 120 uses the evaluation of experimental performance 20 and estimated workload 26 to determine experimental prediction value 24.

In block 814, controller 120 compares default prediction value 22 with experimental prediction value 24. In some implementations, controller 120 can determine whether one of default prediction value 22 or experimental prediction value 24 is larger or indicates a longer predicted usable life for the head. In other implementations, controller 120 can determine whether experimental prediction value 24 is larger or indicates a longer predicted usable life by more than a predetermined amount.

In block 816, controller 120 determines whether to replace current default write policy 14 with experimental write policy 18 based on the comparison of default prediction value 22 with experimental prediction value 24. Controller 120 may replace current default write policy 14 if experimental prediction value 24 indicates a longer life for the head if experimental write policy 18 is used in place of current default write policy 14. As noted above, each of default write policy 14 and experimental write policy 18 can include respective sets of write settings adjusted for different radial locations on disk surface 166. In addition, default write policy 14 and experimental write policy 18 can include write settings for multiple write-assistive components of the head.

The foregoing disclosure can ordinarily extend the usable life of heads that use energy-assisted recording by trading excess performance margin for lower power settings for one or more write-assistive components of the head. The testing and evaluation of experimental write policies can be performed periodically in the field while the DSD is in operation to provide dynamically changing write-assistive policies that provide the desired tradeoff between performance and usable life at different points throughout the life of the head. This can further allow for actual operating conditions, such as the actual workload and environmental conditions during operation, to be taken into consideration in addition to variations in the construction and materials of the particular head. A more individualized, accurate, and up-to-date estimate for the usable life of a head can allow for the fine-tuning of energy-assisted write settings in the field to make the use of such emergent recording technologies feasible over the life of a DSD.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable medium, an optical medium, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
a magnetic storage medium;
a head configured to read and write data on the magnetic storage medium, and wherein the head includes at least one write-assistive component configured to assist in writing data on the magnetic storage medium using a current default write policy that affects the amount of power output by the at least one write-assistive component; and
a controller configured to:
perform one or more experimental writes by writing data on the magnetic storage medium using an experimental write policy for the at least one write-assistive component;
read the data from the magnetic storage medium that was written for the one or more experimental writes;
evaluate an experimental performance of the one or more experimental writes based on the reading of the data written for the one or more experimental writes;
determine an experimental prediction value indicating a predicted usable life of the head based on the evaluation of the experimental performance of the one or more experimental writes;
evaluate a default performance of one or more non-experimental writes based on the reading of data written for the one or more non-experimental writes using the current default write policy;
determine a default prediction value indicating a usable life of the head based on the evaluation of the default performance of the one or more non-experimental writes;
compare the default prediction value with the experimental prediction value; and
based on the comparison of the default prediction value with the experimental prediction value, determine whether to change the current default write policy for the at least one write-assistive component for future non-experimental writes.

2. The DSD of claim 1, wherein the at least one write-assistive component includes at least one of a heater configured to adjust a fly height of the head over the magnetic storage medium, a laser diode configured to heat a surface of the magnetic storage medium, and a microwave field generator configured to generate a microwave field.

3. The DSD of claim 1, wherein the controller is further configured to:
estimate a workload of the head; and
determine the experimental prediction value based on the estimated workload and the evaluation of the experimental performance of the one or more experimental writes.

4. The DSD of claim 1, wherein the controller is further configured to
determine whether to replace the current default write policy with the experimental write policy based on the comparison of the default prediction value with the experimental prediction value.

5. The DSD of claim 1, wherein in evaluating the experimental performance of the one or more experimental writes, the controller is further configured to evaluate at least one of a signal quality for the read data and a latency in reading the data.

6. The DSD of claim 1, wherein the controller is further configured to determine the experimental write policy based on an evaluation of one or more earlier experimental writes for one or more earlier experimental write policies.

7. The DSD of claim 1, wherein the head includes a plurality of write-assistive components each configured to assist in writing data on the magnetic storage medium for the one or more experimental writes by using respective experimental settings that cumulatively form the experimental write policy, and wherein the controller is further configured to determine the experimental prediction value based on the respective experimental settings.

8. The DSD of claim 7, wherein the controller is further configured to determine a first experimental setting for a first write-assistive component and determine a second experimental setting for a second write-assistive component based on an evaluation of one or more earlier experimental writes for one or more earlier experimental write policies.

9. The DSD of claim 1, wherein the controller is further configured to:
include an indication of the experimental write policy in the data written for the one or more experimental writes; and
identify the data written for the one or more experimental writes using the indication of the experimental write policy after performing non-experimental read operations on the magnetic storage medium.

10. The DSD of claim 1, wherein the controller is further configured to perform the one or more experimental writes as part of a maintenance operation of the DSD.

11. The DSD of claim 1, wherein the controller is further configured to
determine the experimental write policy based on the evaluation of the default performance of the one or more non-experimental writes.

12. The DSD of claim 1, wherein the one or more experimental writes include a plurality of experimental writes at different radial locations on the magnetic storage medium.

13. The DSD of claim 1, wherein the experimental write policy and the current default write policy include respective sets of write settings for different radial locations on the magnetic storage medium.

14. A method of operating a Data Storage Device (DSD) including a magnetic storage medium and a head configured to read and write data on the magnetic storage medium using a current default write policy that affects an amount of power output by at least one write-assistive component of the head, the method comprising:
performing one or more experimental writes by writing data on the magnetic storage medium using an experimental write policy for the at least one write-assistive component;
including an indication of the experimental write policy in the data written for the one or more experimental writes;
reading the data from the magnetic storage medium that was written for the one or more experimental writes;
identifying the data written for the one or more experimental writes using the indication of the experimental write policy after performing non-experimental read operations on the magnetic storage medium;
evaluating an experimental performance of the one or more experimental writes based on the reading of the data written for the one or more experimental writes;
determining an experimental prediction value indicating a predicted usable life of the head based on the evaluation of the experimental performance of the one or more experimental writes; and
based on the experimental prediction value, determining whether to change the current default write policy for the at least one write-assistive component for future non-experimental writes.

15. The method of claim 14, wherein the at least one write-assistive component includes at least one of a heater configured to adjust a fly height of the head over the magnetic storage medium, a laser diode configured to heat a surface of the magnetic storage medium, and a microwave field generator configured to generate a microwave field.

16. The method of claim 14, further comprising:
estimating a workload of the head; and
determining the experimental prediction value based on the estimated workload and the evaluation of the experimental performance of the one or more experimental writes.

17. The method of claim 14, further comprising:
evaluating a default performance of one or more non-experimental writes based on the reading of data written for the one or more non-experimental writes using the current default write policy;
determining a default prediction value indicating a predicted usable life of the head based on the evaluation of the default performance of the one or more non-experimental writes;
comparing the default prediction value with the experimental prediction value; and
determining whether to replace the current default write policy with the experimental write policy based on the comparison of the default prediction value with the experimental prediction value.

18. The method of claim 14, wherein in evaluating the performance of the one or more experimental writes, the method further comprises evaluating at least one of a signal quality for the read data and a latency in reading the data.

19. The method of claim 14, further comprising determining the experimental write policy based on an evaluation of one or more earlier experimental writes for one or more earlier experimental write policies.

20. The method of claim 14, wherein the head includes a plurality of write-assistive components each configured to assist in writing data on the magnetic storage medium for the one or more experimental writes by using respective experimental settings that cumulatively form the experimental write policy, and wherein the method further comprises determining the experimental prediction value based on the respective experimental settings.

21. The method of claim 20, further comprising determining a first experimental setting for a first write-assistive component and determining a second experimental setting for a second write-assistive component based on an evaluation of one or more earlier experimental writes for one or more earlier experimental write policies.

22. The method of claim 14, further comprising performing the one or more experimental writes as part of a maintenance operation of the DSD.

23. The method of claim 14, further comprising:
evaluating a default performance of one or more non-experimental writes based on the reading of data written for the one or more non-experimental writes using the current default write policy; and
determining the experimental write policy based on the evaluation of the default performance of the one or more non-experimental writes.

24. The method of claim 14, wherein the one or more experimental writes include a plurality of experimental writes at different radial locations on the magnetic storage medium.

25. The method of claim 14, wherein the experimental write policy and the current default write policy include respective sets of write settings for different radial locations on the magnetic storage medium.

26. A non-transitory computer readable medium storing computer-executable instructions, wherein when the computer-executable instructions are executed by a controller of a Data Storage Device (DSD) including a magnetic storage medium and a head configured to read and write data on the magnetic storage medium, the computer-executable instructions cause the controller to:
perform one or more experimental writes by writing data on the magnetic storage medium using an experimental write policy for at least one write-assistive component of the head;
read the data from the magnetic storage medium that was written for the one or more experimental writes;
evaluate an experimental performance of the one or more experimental writes based on the reading of the data written for the one or more experimental writes;
determine an experimental prediction value indicating a predicted usable life of the head based on the evaluation of the experimental performance of the one or more experimental writes;
evaluate a default performance of one or more non-experimental writes based on the reading of data written for the one or more non-experimental writes using a current default write policy;
determine a default prediction value indicating a usable life of the head based on the evaluation of the default performance of the one or more non-experimental writes;
compare the default prediction value with the experimental prediction value; and
based on the comparison of the default prediction value with the experimental prediction value, determine whether to change the current default write policy for the at least one write-assistive component for future non-experimental writes.

27. A Data Storage Device (DSD), comprising:
a magnetic storage medium;
a head configured to read and write data on the magnetic storage medium, and wherein the head includes at least one write-assistive component configured to assist in writing data on the magnetic storage medium using a current default write policy that affects the amount of power output by the at least one write-assistive component; and
a controller configured to:
evaluate a default performance of one or more non-experimental writes based on the reading of data written for the one or more non-experimental writes using the current default write policy;
determine an experimental write policy based on the evaluation of the default performance of the one or more non-experimental writes
perform one or more experimental writes by writing data on the magnetic storage medium using the experimental write policy for the at least one write-assistive component;
read the data from the magnetic storage medium that was written for the one or more experimental writes;
evaluate an experimental performance of the one or more experimental writes based on the reading of the data written for the one or more experimental writes;
determine an experimental prediction value indicating a predicted usable life of the head based on the evaluation of the experimental performance of the one or more experimental writes; and
based on the experimental prediction value, determine whether to change the current default write policy for the at least one write-assistive component for future non-experimental writes.

* * * * *